US009889471B2

(12) United States Patent
Göthe et al.

(10) Patent No.: US 9,889,471 B2
(45) Date of Patent: *Feb. 13, 2018

(54) PROCESS FOR APPLICATION OF METAL

(71) Applicant: Cuptronic Technology Ltd., Limassol (CY)

(72) Inventors: Sven Göthe, Bromma (SE); Björn Atthoff, Uppsala (SE)

(73) Assignee: Cuptronic Technology Ltd., Limassol (CY)

( * ) Notice: Subject to any disclaimer, the term of this patent is extended or adjusted under 35 U.S.C. 154(b) by 175 days.

This patent is subject to a terminal disclaimer.

(21) Appl. No.: 14/533,126

(22) Filed: Nov. 5, 2014

(65) Prior Publication Data

US 2015/0056410 A1 Feb. 26, 2015

Related U.S. Application Data

(63) Continuation of application No. PCT/EP2013/059500, filed on May 7, 2013.

(60) Provisional application No. 61/643,382, filed on May 7, 2012.

(30) Foreign Application Priority Data

May 7, 2012 (SE) ...................................... 1250464

(51) Int. Cl.
| | | |
|---|---|---|
| *B05D 7/00* | (2006.01) | |
| *C23C 18/16* | (2006.01) | |
| *C23C 18/20* | (2006.01) | |
| *C23C 18/30* | (2006.01) | |
| *C23C 18/18* | (2006.01) | |
| *B05D 3/06* | (2006.01) | |
| *B05D 5/00* | (2006.01) | |
| *C08J 7/04* | (2006.01) | |

(52) U.S. Cl.
CPC ............... *B05D 7/548* (2013.01); *B05D 3/06* (2013.01); *B05D 5/00* (2013.01); *C08J 7/045* (2013.01); *C23C 18/1608* (2013.01); *C23C 18/1612* (2013.01); *C23C 18/182* (2013.01); *C23C 18/1844* (2013.01); *C23C 18/1868* (2013.01); *C23C 18/1882* (2013.01); *C23C 18/204* (2013.01); *C23C 18/2006* (2013.01); *C23C 18/2086* (2013.01); *C23C 18/30* (2013.01); *C08J 2355/02* (2013.01); *C08J 2369/00* (2013.01); *C08J 2433/02* (2013.01); *Y10T 428/24355* (2015.01)

(58) Field of Classification Search
CPC ... B05D 3/06; B05D 5/00; B05D 7/548; C08J 2355/02; C08J 2369/00; C08J 2433/02; C08J 7/045; C23C 18/1608; C23C 18/1612; C23C 18/182; C23C 18/1844; C23C 18/1868; C23C 18/1882; C23C 18/2006; C23C 18/204; C23C 18/2086; C23C 18/30; Y10T 428/24355
USPC .......................... 428/141; 427/510, 517, 519
See application file for complete search history.

(56) References Cited

U.S. PATENT DOCUMENTS

| 6,303,278 B1 | 10/2001 | Larsson et al. |
|---|---|---|
| 2007/0043160 A1 | 2/2007 | Hanley et al. |
| 2009/0035559 A1 | 2/2009 | Kitamura et al. |
| 2009/0205853 A1* | 8/2009 | Larsson .............. C23C 18/1605 174/256 |
| 2011/0088934 A1 | 4/2011 | Kano et al. |

FOREIGN PATENT DOCUMENTS

| JP | 08337880 A | 12/1996 |
|---|---|---|
| JP | 2001509213 A | 7/2001 |
| WO | WO 98/34446 | 8/1998 |
| WO | WO 2007/116057 | 10/2007 |

OTHER PUBLICATIONS

"Impact of Oxygen on Photopolymerization Kinetics and Polymer Structure" Allison O'Brien and Christopher Bowman, Macromolecules, 2006, 39, 2501-2506.*

* cited by examiner

*Primary Examiner* — Frances Tischler
(74) *Attorney, Agent, or Firm* — Porter, Wright, Morris & Arthur LLP

(57) ABSTRACT

A process for application of metal on a substrate surface comprises applying a mixture of a solvent, a polymerizable monomer, and a photoinitiator on a substrate surface, wherein the photoinitiator does not form two phases together with the monomer and the solvent, i.e. it forms an amorphous mixture without any crystals. The monomer is able to polymerize to a polymer comprising at least one carboxylic group. Thereafter the solvent is evaporated. Polymerization is induced by irradiating the applied dried mixture. Ions are applied and reduced to metal and thereafter further metal can be deposited. The method can be used in industrial processes, both 2D and 3D surfaces can be coated with metal. Materials sensitive to standard grafting chemicals and/or polymers containing halogen atoms can be coated.

13 Claims, No Drawings

PROCESS FOR APPLICATION OF METAL

This application is a continuation of PCT Application No. PCT/EP2013/059500, filed 7 May 2013, which claims the benefit of U.S. Provisional No. 61/643,382 filed 7 May 2012, 2012, and claims priority of SE 1250464-3, filed 7 May 2012, the entire contents of each of which are hereby incorporated by reference.

BACKGROUND

The present invention relates generally to a method of applying a metal on a substrate surface.

In prior art many different methods of applying a metal on a substrate surface are described.

WO 98/34446 discloses a method to apply conducting materials in distinct patterns on organic substrates, the surface layer is chemically modified to achieve distinct adhesion areas according to said distinct pattern, after which conducting material is applied to these areas.

WO 2007/116056 discloses a method for applying a metal on a substrate, comprising: a) producing polymers on the surface of the substrate, where the polymers comprise carboxylic groups and adsorbed ions of at least one other metal, b) reducing the ions to the second metal and c) depositing the first metal on the reduced ions. Plasma treatment is mentioned as in an initial step in order to improve the wetting of the subsequent solutions that are applied to the surface, and as a cleaning step.

WO 2007/116057 discloses the above process applied to paper.

A large problem today is the industrialization of the full additive processes regarding handling and productivity in production. Today processes with wet grafting chemistry are used. This creates problems in the production lines when it comes to handling and robustness.

No method fulfills the requirements with regards to: Handling of parts in the process, robustness. Productivity and line speed. Grafting onto different polymer surfaces. For instance it is a problem in the state of the art to apply metal onto inert and sensitive materials. Example of a sensitive material includes but is not limited to PC-ABS. Further halogen containing materials are known to be difficult to coat. A process which allows coating of both 2D and 3D substrates is also difficult to obtain.

Sensitive substrate cannot always be coated using the methods according to the state of the art, since the substrate may be sensitive to the grafting chemicals and/or process conditions.

Another problem in the prior art is the use of some photoinitiators in connection with production of polymers on a surface, since many photoinitiators tend to crystallize. For instance benzophenone is difficult of impossible to use as a photoinitiator in many applications because it forms crystals.

SUMMARY

It is an object of the present invention to obviate at least some of the disadvantages in the prior art and to provide an improved method for applying metal on a substrate.

In a first aspect there is provided a method for application of a first metal on a substrate surface, said method comprising the steps: a) providing a mixture comprising at least one solvent, at least one polymerizable monomer, and at least one photoinitiator, wherein said at least one photoinitiator, said at least one polymerizable monomer, and said at least one solvent form an amorphous mixture without any crystals, wherein said at least one polymerizable monomer is able to polymerize to a polymer comprising at least one carboxylic group, and wherein said at least one polymerizable monomer is in monomer form in said mixture, b) applying said mixture at least partially on said substrate surface, said substrate surface comprises covalently bound hydrogen atoms, c) evaporating at least a part of said at least one solvent. d) activating said at least one photoinitiator by irradiation with light at a wavelength adapted to said at least one photoinitiator so that said at least one photoinitiator decomposes into at least one free radical, so that said at least one free radical initiates a polymerization reaction among said at least one polymerizable monomers and induce a reaction between said covalently bound hydrogen atoms on said substrate surface and a fraction of said at least one polymerizable monomers, to obtain polymers on the surface of said substrate, wherein said polymers comprise at least one carboxylic group, and wherein at least a fraction of said polymers formed are covalently bound to said surface, e) applying at least one selected from the group consisting of ions of at least one second metal and nanoparticles comprising at least one second metal, wherein said nanoparticles have an average diameter in the range from 1 to 100 nm, f) if ions of at least one second metal have been applied, at least partially reducing said ions of at least one second metal to metal, g) depositing the first metal on at least one selected from the group consisting of the reduced ions of said at least one second metal and the nanoparticles comprising at least one second metal.

Further aspects and embodiments are defined in the appended dependent claims, which are specifically incorporated herein by reference.

One advantage is that the current method at least obviates handling problems with wet surfaces in industrial processes.

Both 2D and 3D surfaces can be coated with metal.

Polymers sensitive to standard grafting chemicals or polymers containing halogen atoms can be coated using the method, since it is generally gentler compared to the grafting chemicals commonly utilized. One non limiting example of a sensitive material is PC-ABS. (Polycarbonate/Acrylonitrile Butadiene Styrene, —a blend of PC and ABS).

Photoinitiators which otherwise form crystals making them very difficult or impossible to use can be used, since the mixture of photoinitiator, polymerizable monomer and solvent give a mixture where no crystals occur, i.e. an amorphous mixture.

Another advantage is that monomers are used to build up the polymers on the surface, this is easier compared to attaching polymers on a surface.

DETAILED DESCRIPTION

Before the invention is disclosed and described in detail, it is to be understood that this invention is not limited to particular compounds, configurations, method steps, substrates, and materials disclosed herein as such compounds, configurations, method steps, substrates, and materials may vary somewhat. It is also to be understood that the terminology employed herein is used for the purpose of describing particular embodiments only and is not intended to be limiting since the scope of the present invention is limited only by the appended claims and equivalents thereof.

It must be noted that, as used in this specification and the appended claims, the singular forms "a", "an" and "the" include plural referents unless the context clearly dictates otherwise.

If nothing else is defined, any terms and scientific terminology used herein are intended to have the meanings commonly understood by those of skill in the art to which this invention pertains.

Amorphous in connection with a mixture indicates that the mixture does not comprise any crystals.

The new technology is a full additive process with a dry grafting step in combination with irradiation with light for metal plating on substrate surfaces, including but not limited to polymer substrates. There is today no known dry grafting process commercially available or described in literature, because reactions in solid phase in general are very slow and have low yield for grafting onto polymer surfaces. The new technology solves these drawbacks.

The photochemistry and the grafting process shall function in a dry state and generate active sites for metal plating on surfaces. To achieve this it is preferred to have: a relatively fast drying grafting solution, the solubility of monomers and photo activators should be optimized, the photochemistry shall work in solid state with high yield of generating grafting sites and polymer chain growing from these sites. The impact of oxygen in the process can be minimized through optimizing the thickness of the dry layer or use of protective gases.

The wavelength of the laser or light used for irradiation should match the absorption of spectra of the photo activator.

In a first aspect there is provided a method for application of a first metal on a substrate surface, said method comprising the steps:
a) providing a mixture comprising at least one solvent, at least one polymerizable monomer, and at least one photoinitiator, wherein said at least one photoinitiator, said at least one polymerizable monomer, and said at least one solvent form an amorphous mixture without any crystals, wherein said at least one polymerizable monomer is able to polymerize to a polymer comprising at least one carboxylic group, and wherein said at least one polymerizable monomer is in monomer form in said mixture,
b) applying said mixture at least partially on said substrate surface, said substrate surface comprises covalently bound hydrogen atoms,
c) evaporating at least a part of said at least one solvent.
d) activating said at least one photoinitiator by irradiation with light at a wavelength adapted to said at least one photoinitiator so that said at least one photoinitiator decomposes into at least one free radical, so that said at least one free radical initiates a polymerization reaction among said at least one polymerizable monomers and induce a reaction between said covalently bound hydrogen atoms on said substrate surface and a fraction of said at least one polymerizable monomers, to obtain polymers on the surface of said substrate, wherein said polymers comprise at least one carboxylic group, and wherein at least a fraction of said polymers formed are covalently bound to said surface,
e) applying at least one selected from the group consisting of ions of at least one second metal and nanoparticles comprising at least one second metal, wherein said nanoparticles have an average diameter in the range from 1 to 100 nm,
f) if ions of at least one second metal have been applied, at least partially reducing said ions of at least one second metal to metal,
g) depositing the first metal on at least one selected from the group consisting of the reduced ions of said at least one second metal and the nanoparticles comprising at least one second metal.

The steps a-c creates a substrate where the surface at least partially is covered by a layer which subsequently can be irradiated and give a metal coating on the substrate surface. Experiments show that a coated surface can be kept for at least several weeks and still be used for preparing a metal surface, i.e. before the steps d-g are performed.

The viscosity of the dried layer, i.e. after step c when the solvent has been evaporated is such that it stays on the substrate.

In order to coat the substrate surface at least partially with metal the method further comprises the steps: d-g.

Nanoparticles are particles smaller than 100 nm.

In one embodiment the at least one solvent is evaporated to more than 80% calculated by weight in step c). In one embodiment the at least one solvent is evaporated to more than 90% calculated by weight. In one embodiment the at least one solvent is evaporated to more than 95% calculated by weight.

The solvent is at least one solvent selected from different solvents including alcohols, ethers and esters. When more than one solvent is used this refers to a mixture of solvents, which should form one phase, i.e. be soluble in each other and not form two phases. In one embodiment the at least one solvent is at least one solvent selected from the group consisting of methanol, ethanol, acetone, ethyl acetate, and ethylene glycol.

In one embodiment the at least one polymerizable monomer comprises at least one carboxylic acid group. In one embodiment the at least one polymerizable monomer is at least one selected from the group consisting of methacrylic acid, acrylic acid, and maleic acid.

In one embodiment the at least one photoinitiator, is at least one photoinitiator selected from the group consisting of antraquinone, thioxanthone, isopropyl thioxanthone, chlorothioxanthone, xanthone, benzophenone, and fluorenone.

In one embodiment the at least one photoinitiator is activated in step d) by irradiation with light in a desired pattern on said substrate surface. In one embodiment the at least one photoinitiator is activated in step d) by irradiation with at least one type of light selected from the group consisting of laser light, focused laser light, and focused light. The light is focused on the parts of the substrate surface where it is desired to have a metal coating. In one embodiment the at least one photoinitiator is activated in step d) by irradiation with at least one selected from laser light, and light in combination with at least one mask. The mask is positioned between the substrate surface and the light source. In one embodiment the mask is positioned directly on the substrate surface.

In one embodiment at least one of the steps b, c, and d in claim 1 are performed in an environment with a reduced level of oxygen compared to a normal atmosphere in order to reduce oxygen inhibition of a radical polymerisation initiator.

In one embodiment the substrate surface is a two dimensional plane. In an alternative embodiment the substrate surface is a three dimensional surface. It is easy to apply the solution to both two dimensional surface and three dimensional surfaces. This is both due to the viscosity of the mixture and the fact that a photoinitiator is used so that the reaction can be initiated by focusing light on the desired part. Focusing light can be done both on a 2 dimensional plane as well as on most 3-dimensional objects.

In one embodiment the substrate surface is treated with plasma before step b).

In one embodiment the at least a fraction of polymers which are not covalently bound to the surface are washed away from said substrate surface after step d). In an alternatively embodiment essentially all polymers which are not covalently bound to the surface are washed away from said substrate surface after step d).

In one embodiment the thickness of the applied mixture is 5-200 µm. The thickness is measured on the areas on the substrate where the mixture is applied. The thickness is measured when the solvent has been evaporated to more than 80% calculated by weight. For best accuracy the thickness should be measured when the solvent is evaporated to 95% calculated by weight. The thickness 5-200 µm refers to a state when the solvent is evaporated to 95% calculated by weight.

The applications of metal coated objects are numerous in many different fields. Here non limiting examples of some applications are given. In one embodiment the substrate comprises a circuit. In one embodiment the substrate is a printed wire board. In one embodiment the substrate is an antenna intended for radio frequent electromagnetic waves. In one embodiment the substrate is an antenna for telecommunication. In one embodiment the substrate is a fuel cell. In one embodiment the substrate is a solar cell. In one embodiment the substrate is a light reflector. In one embodiment the substrate is an automotive light reflector. In one embodiment the substrate comprises plastic. In one embodiment the substrate is a container. In one embodiment the substrate is a container intended for liquids. In one embodiment the substrate is a bottle. In one embodiment the substrate is a container intended for perfume.

In one embodiment the substrate comprises more than one layer of conductors, which conductors are electrically insulated from each other. There is provided the possibility to form a circuit in several layers by applying several layers of conductive metal with insulating material in between.

The process has been verified with energies down to 300-500 mJ/cm².

Examples of monomers, solvents and initiators that work well together and form an amorphous mixture without crystals include but are not limited to:
Methacrylic acid+thioxanthone+methanol
Acrylic acid+thioxanthone+methanol
Methacrylic acid+chlorothioxanthone+ethanol
Methacrylic acid+chlorothioxanthone+methanol/ethanol (1:1 by weight)
Methacrylic acid+isopropyl thioxanthone+acetone/ethanol (1:1 by weight)
Acrylic acid+fluorenone+methanol/ethanol (1:1 by weight)
Maleic acid+bensofenone+ethylacetate Rz is defined as the average distance between the highest peak and lowest valley. It is the average of five Rzi values from five reference lengths lr within an evaluation length. It is defined according to SS-EN ISO 4287:1998. For Rz below 100 µm the adhesion to the surface is excellent for coated substrates. Otherwise so smooth surface are difficult to coat with metal with high adhesion. In particular In a second aspect there is provided an object coated with a metal, said object being at least partly coated with covalently bound polymers comprising carboxylic groups, said object further being coated with a metal on the covalently bound polymers, said object having a surface roughness Rz of less than 100 µm before coating measured according to SS-EN ISO 4287:1998, wherein the coating of the object has an adhesion equal to or larger than 10 N/cm, measured according to ASTM D1876.

In one embodiment the object to be coated comprises a polymer before application of the coating.

In one embodiment the object is transparent.

In one embodiment the substrate further comprises at least one selected from the group consisting of a filler, a pigment, and a fiber.

In one embodiment the object having a surface roughness Rz of less than 50 µm before coating. In one embodiment the object having a surface roughness Rz of less than 11 µm before coating. In one embodiment the object having a surface roughness Rz of less than 2 µm before coating.

For Rz below 100 µm the adhesion to the surface is excellent for coated substrates. Otherwise so smooth surface are difficult to coat with metal with high adhesion. In particular even smoother surfaces can be coated with excellent adhesion such as Rz=2 µm or even 0.5 µm.

In one embodiment the coating of the object has an adhesion equal to or larger than 14 N/cm, measured according to ASTM D1876.

Other features and uses of the invention and their associated advantages will be evident to a person skilled in the art upon reading the description and the examples.

It is to be understood that this invention is not limited to the particular embodiments shown here. The following examples are provided for illustrative purposes and are not intended to limit the scope of the invention since the scope of the present invention is limited only by the appended claims and equivalents thereof.

EXAMPLES

Example 1

A grafting solution consisting of methacrylic acid (1 weight-%), thioxanthone (0.01 weight-%) and methanol was prepared.

The solution was sprayed by an air spray gun to a panel made of PA 6/PA 66 polymer filled with carbon black and glass fiber (50 weight-%) of 8×8 cm size. The dry thickness was varied from 10 µm to 50 µm. Drying time (sample could be handle without damaging the dry grafting layer) varied from 10 seconds to 40 seconds at room temperature dependent on wet film thickness.

The panels were irradiated with a 2 W laser emitting light at 355 nm.

The samples were irradiated with an energy of 800 mJ/cm². The spot diameter was 120 µm. The irradiated pattern was straight lines of 180 µm with a distance of 400 µm between the lines.

After irradiation were the samples washed in deionized water (DIW). In the next step were the samples activated in a commercial solution containing palladium (II) ions. The palladium ions were reduced to palladium metal by dipping the panel in a commercial reducing media. The panels were then washed in DIW before placing them in a commercial chemical copper bath for copper plating.

The results on the panels were straight lines of copper with a line width between 178 to 182 µm and a distance of 400 µm between the copper lines with film thickness of 6 to 8 µm.

Example 2

A grafting solution consisting of acrylic acid (1.2 weight-%), thioxanthone (0.01 weight-%) and ethanol was prepared.

The solution was sprayed by an air spray gun to a panel made of PA 6 polymer filled with carbon black and glass fiber (50 wt %) of 8×8 cm size. The dry thickness was varied from 10 μm to 50 μm. Drying time (sample could be handle without damaging the dry grafting layer) varied from 10 seconds to 40 seconds at room temperature dependent on wet film thickness.

The panels were irradiated with a 2 W laser emitting light at 355 nm.

The samples were irradiated with energy of 900 mJ/cm$^2$. The spot diameter was 120 μm. The irradiated pattern was straight lines of 180 μm with a distance of 400 μm between the lines.

After irradiation were the samples washed in deionized water (DIW). In the next step were the samples activated in a commercial solution containing palladium (II) ions. The palladium ions were reduced to palladium metal by dipping the panel in a commercial reducing media. The panels were then washed in DIW before placing them in a commercial chemical copper bath for copper plating.

The results on the panels were straight lines of copper with a line width between 178 to 182 μm and a distance of 400 μm between the copper lines with film thickness of 0.8 to 1.2 μm.

Example 3

After different times—laser irradiation, multiple scanning

A grafting solution consisting of methacrylic acid (1 weight-%), chlorothioxanthone (0.01 weight-%) and ethanol was prepared.

The solution was sprayed by an air spray gun to a panel made of PA 6/PA 66 polymer filled with carbon black and glass fiber (50 weight-%) of 8×8 cm size. The dry thickness was varied from 10 μm to 50 μm. Drying time (sample could be handle without damaging the dry grafting layer) varied from 10 seconds to 40 seconds at room temperature dependent on wet film thickness.

The panels were irradiated with a 4 W laser emitting light at 355 nm.

The samples were irradiated with different energy dependent on laser speed and number of repetition. The spot diameter was 120 μm. The irradiated pattern was straight lines of 180 μm with a distance of 400 μm between the lines.

After irradiation were the samples washed in deionized water (DIW). In the next step were the samples activated in a commercial solution containing palladium(II) ions. The palladium ions were reduced to palladium metal by dipping the panel in a commercial reducing media. The panels were then washed in DIW before placing them in a commercial chemical copper bath for copper plating.

The results on the panels were straight lines of copper with a line width between 178 to 182 μm and a distance of 200 μm between the copper lines.

| Laser scan speed (every pulse 16 ps, 1 repetition) (m/s) | Defined pattern with high resolution | Film thickness (μm) |
| --- | --- | --- |
| 4 | Yes | 1.1-1.3 |
| 8 | Yes | 1.1-1.3 |
| 12 | Yes | 1.2-1.4 |
| 20 | Yes | 1.0-1.2 |

| Number of repetition of the laser ray (every pulse 16 ps, laser scan speed 4 m/s) (m/s) | Defined pattern with high resolution | Film thickness (μm) |
| --- | --- | --- |
| 2 | Yes | 1.2-1.4 |
| 4 | Yes | 1.1-1.3 |
| 8 | Yes | 1.0-1.2 |
| 16 | Yes | 1.1-1.3 |

| Irradiation energy (mJ/cm$^2$) | Defined pattern with high resolution | Film thickness (μm) |
| --- | --- | --- |
| 200 | Yes. with some small distortion | 1.0-1.2 |
| 400 | Yes | 1.1-1.3 |
| 800 | Yes | 1.1-1.3 |
| 2000 | Yes | 1.2-1.4 |

Example 4

Different film thickness—time in Cu bath

A grafting solution consisting of methacrylic acid (1 weight-%), chlorothioxanthone (0.01 weight-%) and methanol/ethanol (1:1) was prepared.

The solution was sprayed by an air spray gun to a panel made of PA 6/PA 66 polymer filled with carbon black and glass fiber (50 weight-%) of 8×8 cm size. The dry thickness was varied from 10 μm to 50 μm. Drying time (sample could be handle without damaging the dry grafting layer) varied from 10 seconds to 40 seconds at room temperature dependent on wet film thickness.

The panels were irradiated with a 2 W laser emitting light at 355 nm.

The samples were irradiated with an energy of 500 mJ/cm$^2$. The spot diameter was 120 μm. The irradiated pattern was straight lines of 180 μm with a distance of 400 μm between the lines.

After irradiation were the samples washed in deionized water (DIW). In the next step were the samples activated in a commercial solution containing palladium (II) ions. The palladium ions were reduced to palladium metal by dipping the panel in a commercial reducing media. The panels were then washed in DIW before placing them in a commercial chemical copper bath for copper plating.

The results on the panels were straight lines of copper with a line width between 178 to 182 μm and a distance of 300 μm between the copper lines.

| Time in copper bath (min) | Defined pattern with high resolution | Film thickness (μm) |
| --- | --- | --- |
| 20 | Yes | 0.6-0.8 |
| 60 | Yes | 1.7-1.9 |
| 180 | Yes | 5.8-6.1 |
| 300 | Yes | 9.6-10.4 |

Example 5

Different patterns have been made with line width ranging from 5 μm to 3 cm.

A grafting solution consisting of methacrylic acid (1.4 weight-%), thioxanthone (0.01 weight-%) and methanol was prepared.

The solution was sprayed by an air spray gun to a panel made of COO polymer of 8×8 cm size. The dry thickness was 25 μm. Drying time (sample could be handle without damaging the dry grafting layer) was 40 seconds at room temperature.

The panels were irradiated with a 2 W laser emitting light at 355 nm.

The samples were irradiated with an energy of 800 mJ/cm$^2$. The spot diameter was varied from 5 μm to 200 μm. The irradiated pattern was straight lines. The line width was varied from 5 μm to 5000 μm.

After irradiation were the samples washed in deionized water (DIW). In the next step were the samples activated in a commercial solution containing palladium (II) ions. The palladium ions were reduced to palladium metal by dipping the panel in a commercial reducing media. The panels were then washed in DIW before placing them in a commercial chemical copper bath for copper plating.

| Line Width (μm) | Defined pattern with high resolution | Film thickness (μm) |
| --- | --- | --- |
| 5 | Yes | 0.7 |
| 10 | Yes | 0.6 |
| 40 | Yes | 0.7 |
| 100 | Yes | 0.7 |
| 200 | Yes | 0.5 |
| 500 | Yes | 0.7 |
| Multiple scan 2000 | Yes | 0.6 |
| Multiple scan 5000 | Yes | 0.7 |
| Multiple scan | | |

Example 6

Different Materials:

A grafting solution consisting of acrylic acid (1.0 weight-%), thioxanthone (0.01 weight-%) and ethanol was prepared.

The solution was sprayed by an air spray gun to different panels (see table below) of 8×8 cm size. The dry thickness was 20 μm. Drying time (sample could be handle without damaging the dry grafting layer) varied from 30 to 50 seconds at room temperature.

The panels were irradiated with a 4 W laser emitting light at 355 nm.

The samples were irradiated with an energy of 600 mJ/cm$^2$. The spot diameter was 120 μm. The irradiated pattern was straight lines of 180 μm with a distance of 400 μm between the lines.

After irradiation were the samples washed in deionized water (DIW). In the next step were the samples activated in a commercial solution containing palladium (II) ions. The palladium ions were reduced to palladium metal by dipping the panel in a commercial reducing media. The panels were then washed in DIW before placing them in a commercial chemical copper bath for copper plating.

The results on the panels were straight lines of copper with a line width between 178 to 182 μm and a distance of 400 μm between the copper lines with film thickness of 6 to 8 μm.

| Material | Defined pattern with high resolution | Tape adhesion |
| --- | --- | --- |
| PA6 | Yes | Pass |
| PA6/PA66 filled with carbon and glass fiber (50%) | Yes | Pass |
| PC/ABS | Yes | 1.0-1.2 |
| COC polymer (Zeonor 460) | Yes | 1.2-1.4 |
| COC polymer (Zeonor R1420) | Yes | 1.2-1.4 |
| Aliphatic Polyurethane | Yes | 1.1-1.3 |

The following examples 7-9 were manufactured as for example 1 above. Then a peel test was performed according to ASTM D1876 to determine the adhesion of the applied metal coating. Rz for the uncoated substrate was measured as defined in SS-EN ISO 4287:1998 and found to be lower than the values given below. According to SS-EN 4288 and SS-EN ISO 3274 the measurement conditions were rtip=2 μm, Ir=0.25 mm, In 1.25 mm, It 1.5 mm.

Example 7

Main components are methacrylic acid, acetone, ethanol, and isopropyl thioxanthone on a high gloss surface of PA6 (Rz<0.5 μm). Gives 14 N/cm in adhesion.

Example 8

Main components are acrylic acid, methanol, ethanol, and fluorenone on a surface of PA6 filled with 30% glass fiber (Rz<10 μm). Gives 17 N/cm in adhesion.

Example 9

Main components maleic acid, ethylacetate, and bensofenone derivative on a glossy surface of PA6 filled with 30% glass fiber (<2.0 μm between valley and peak). Gives 16 N/cm in adhesion.

The invention claimed is:

1. A method for application of a first metal on a substrate surface, said method comprising the steps:
   a) providing a mixture comprising at least one solvent, at least one polymerizable monomer, and at least one photoinitiator, wherein said at least one solvent is selected from the group consisting of alcohols, ethers and esters, wherein said at least one photoinitiator, said at least one polymerizable monomer, and said at least one solvent form an entirely amorphous mixture without any crystals, wherein said at least one polymerizable monomer is able to polymerize to a polymer comprising at least one carboxylic group, and wherein said at least one polymerizable monomer is in monomer form in said mixture, b) applying said mixture at least partially on said substrate surface, wherein said substrate surface comprises covalently bound hydrogen atoms, c) evaporating at least a part of said at least one solvent, d) activating said at least one photoinitiator by irradiation with light at a wavelength adapted to said at least one photoinitiator so that said at least one photoinitiator decomposes into at least one free radical, so that said at least one free radical initiates a polymerization reaction among said at least one polymerizable monomer and induces a reaction between said covalently bound hydrogen atoms on said substrate surface and a fraction of said at least one polymerizable monomer, to obtain polymers on the surface of said substrate, wherein said polymers comprise at least one carboxylic group, and wherein at least a fraction of said polymers formed are covalently bound to said surface, e) applying at least one selected from the group consisting of ions of at least one second metal and nanoparticles comprising at least one second metal, wherein said nanoparticles have an average diameter in the range from 1 to 100 nm, f) if ions of at least one second metal have been applied, at least partially reducing said ions of at least one second metal to metal, and g) depositing the first metal on at least one selected from the group consisting of the reduced ions of said at least one second metal and the nanoparticles comprising at least one second metal.

2. The method according to claim 1, wherein said at least one solvent is evaporated to more than 80% calculated by weight in step c).

3. The method according to claim 1, wherein said at least one solvent is at least one solvent selected from the group consisting of methanol, ethanol, acetone, ethyl acetate, and ethylene glycol.

4. The method according to claim 1, wherein said at least one polymerizable monomer is at least one selected from the group consisting of methacrylic acid, acrylic acid, and maleic acid.

5. The method according to claim 1, wherein said at least one photoinitiator, is at least one photoinitiator selected from the group consisting of anthraquinone, thioxanthone, isopropyl thioxanthone, chlorothioxanthone, xanthone, benzophenone, and fluorenone.

6. The method according to claim 1 wherein said at least one photoinitiator is activated in step d) by irradiation with light in a desired pattern on said substrate surface.

7. The method according to claim 1, wherein said at least one photoinitiator is activated in step d) by irradiation with at least one type of light selected from the group consisting of laser light, focused laser light, and focused light.

8. The method according to claim 1, wherein said at least one photoinitiator is activated in step d) by irradiation with at least one selected from laser light, and light in combination with at least one mask.

9. The method according to claim 1, wherein at least one of the steps b, c, and d in claim 1 are performed in an environment with a reduced level of oxygen compared to a normal atmosphere in order to reduce oxygen inhibition of a radical polymerization initiator.

10. The method according to claim 1, wherein said substrate surface is a two dimensional plane.

11. The method according to claim 1, wherein said substrate surface is a three dimensional surface.

12. The method according to claim 1, wherein the substrate surface is treated with plasma before step b).

13. The method according to claim 1, wherein at least a fraction of polymers which are not covalently bound to the surface are washed away from said substrate surface after step d).

* * * * *